US012607559B2

(12) United States Patent
Yanagimoto

(10) Patent No.: US 12,607,559 B2
(45) Date of Patent: Apr. 21, 2026

(54) OPEN RESONATOR

(71) Applicant: EM labs, Inc., Kobe (JP)

(72) Inventor: Yoshiyuki Yanagimoto, Kobe (JP)

(73) Assignee: EM labs, Inc., Kobe (JP)

( * ) Notice: Subject to any disclaimer, the term of this patent is extended or adjusted under 35 U.S.C. 154(b) by 105 days.

(21) Appl. No.: 18/735,176

(22) Filed: Jun. 6, 2024

(65) Prior Publication Data

US 2024/0319092 A1     Sep. 26, 2024

Related U.S. Application Data

(63) Continuation of application No. PCT/JP2022/039890, filed on Oct. 26, 2022.

(30) Foreign Application Priority Data

Feb. 25, 2022     (JP) ................................. 2022-027530

(51) Int. Cl.
*G01N 21/45*          (2006.01)
(52) U.S. Cl.
CPC .................................... *G01N 21/45* (2013.01)
(58) Field of Classification Search
CPC ................................ G01N 21/45; G01N 22/00
See application file for complete search history.

(56) References Cited

U.S. PATENT DOCUMENTS

| | | | | |
|---|---|---|---|---|
| 5,012,212 A | * | 4/1991 | Matsui | H01P 7/00 333/230 |
| 5,379,110 A | * | 1/1995 | Matsui | G01R 27/2658 356/519 |
| 2013/0063158 A1 | * | 3/2013 | Potrepka | G01N 22/00 324/636 |

OTHER PUBLICATIONS

International Search Report for PCT/JP2022/039890 dated Dec. 6, 2022.
PCT written opinion dated Dec. 6, 2022.
A. L. Cullen and P. K. Yu, The accurate measurement of permittivity by means of open resonator, Proc. R. Soc. Lond. A. 325, 493-509 (1971).

* cited by examiner

*Primary Examiner* — Jonathan M Hansen

(57)          ABSTRACT

An open resonator capable of measuring dielectric characteristic of a sample with high accuracy by removing unnecessary higher-order mode resonance. The open resonator includes: a first spherical reflection mirror having a first reflection spherical surface; and a second spherical reflection mirror having a second reflection spherical surface arranged to face the first reflection spherical surface. At least one of diameters of opening surfaces of the first reflection spherical surface and the second reflection spherical surface exposed to a space between the first reflection spherical surface and the second reflection spherical surface is equal to or less than a half of a distance between the first reflection spherical surface and the second reflection spherical surface.

3 Claims, 11 Drawing Sheets

Comparative example 1a

Example 1

Comparative example 1a (without sample)

Example 1 (without sample)

Comparative example 1a (with sample)

Example 1 (with sample)

Comparative example 1a

Example 1

Comparative example 2a

Example 2

Comparative example 2a (without sample)

Example 2 (without sample)

Fig. 9

| Embodiment 1 D=80mm R=64mm | Comparative example 1a M=50mm | | Comparative example 1b M=50mm | | Example 1 M=28mm | |
|---|---|---|---|---|---|---|
| aperture (diameter) | with (large) | | with (small) | | without | |
| measurement frequency (GHz) | 220 | 330 | 220 | 330 | 220 | 330 |
| wavelength λ (mm) | 1.363 | 0.908 | 1.363 | 0.908 | 1.363 | 0.908 |
| M/λ | 36.69 | 55.04 | 36.69 | 55.04 | 20.55 | 30.82 |
| removal of TEM04(q-1) | ○ | × | ○ | ○ | ○ | ○ |
| Amplitude/Q value of TEM00q | ○ | ○ | × | ○ | ○ | ○ |
| Embodiment 2 D=120mm R=96mm | Comparative example 2a M=61mm | | Comparative example 2b M=61mm | | Example 2 M=45mm | |
| aperture (diameter) | with (large) | | with (small) | | without | |
| measurement frequency (GHz) | 110 | 170 | 110 | 170 | 110 | 170 |
| wavelength λ (mm) | 2.725 | 1.763 | 2.725 | 1.763 | 2.725 | 1.763 |
| M/λ | 22.38 | 34.59 | 22.38 | 34.59 | 16.51 | 25.52 |
| removal of TEM04(q-1) | ○ | × | ○ | ○ | ○ | ○ |
| Amplitude/Q value of TEM00q | ○ | ○ | × | ○ | ○ | ○ |

TEM00q

TEM0nq (TEM01q)

TEM0nq (TEM02q)

TEM00q

TEM0nq

OPEN RESONATOR

CROSS-REFERENCE TO RELATED APPLICATIONS

This application claims the benefit of priority and is a Continuation application of the prior International Patent Application No. PCT/JP2022/039890, with an international filing date of Oct. 26, 2022, which designated the United States, and is related to the Japanese Patent Application No. 2022-027530, filed Feb. 25, 2022, the entire disclosures of all applications are expressly incorporated by reference in their entirety herein.

PRIOR ART

[Non-Patent Document 1] A. L. CULLEN and P. K. YU, The accurate measurement of permittivity by means of open resonator, Proc. R. Soc. Lond. A. 325, 493-509 (1971)

BACKGROUND OF THE INVENTION

The present invention relates to an open resonator suitable for measuring dielectric characteristic (real part (relative dielectric constant $\varepsilon'$) of complex relative dielectric constant and dielectric tangent (tan δ)) of dielectric materials.

In the application fields of an on-vehicle radar, an optical communication, a high-speed digital equipment and the like, the frequency in the millimeter wave band is used. It is necessary to improve the position resolution in the radar, increase the communication speed in the optical communication and accelerate the processing in the digital equipment. Thus, it is assumed that the frequency of the millimeter wave to be used is further increased. Currently, the frequency bands of 75-80 GHz, 50 GHz and 40 GHz are used in the most advanced equipment. The frequency range exceeding 100 GHz is assumed in future. In addition, the discussion is held assuming to use the band up to 330 GHz in the sixth-generation communication system (6G) coming next to the fifth-generation communication system (5G). Accordingly, the measurement using higher frequency is required when measuring the material characteristic used for the above described equipment. In the material characteristic, a major problem is energy loss in the millimeter wave caused by high frequency. Thus, it is necessary to solve the problem about the measurement of the dielectric characteristic of the material.

In the measurement of the dielectric characteristic in the millimeter wave band, the reduction of the energy loss is the particularly important purpose to be developed. Thus, the measurement of the dielectric tangent (loss factor, tan δ) is important and the measurement using the resonator is mainly used in the conventional manner. A split cylinder resonator is a typical equipment for performing the above described measurement. The split cylinder resonator is used for measuring the dielectric tangent of low loss materials in the upper limit of approximately 60 GHz. However, it is difficult for the split cylinder resonator to correctly measure the dielectric characteristic in the frequency higher than 60 GHz. An open resonator (Fabry-Perot resonator) is suitable in the frequency higher than 60 GHz (Non-Patent Document 1).

In the Fabry-Perot resonator, the sample formed into a film shape is inserted between two spherical reflection mirrors arranged to face each other, an input signal having a frequency of 100 GHz or more is inputted, for example, the resonance measurement is performed to obtain a resonance waveform and the dielectric characteristic of the sample is measured. A network analyzer is frequently used for the resonance measurement. The network analyzer is connected to the Fabry-Perot resonator. A graph (resonance waveform) showing a frequency as a horizontal axis and a transmission signal intensity (transmission coefficient) as a vertical axis is obtained to measure the resonance characteristics. Here, "resonance characteristics" mean the center frequency (resonance frequency) of the resonance and Q value (ratio between center frequency and 3 dB band width in the specification of the present invention). In general, the relative dielectric constant and the dielectric tangent of the sample are obtained from the resonance characteristics with/without the sample by calculation or simulation.

The above described Non-Patent Document 1 discloses an open resonator wherein a distance D between spherical surfaces of two spherical reflection mirrors is 50 to 70 cm, a curvature radius R of the two spherical reflection mirrors is 127.0 cm, and an opening diameter (diameter) of a reflection spherical surface is 36.8 cm in the two spherical reflection mirrors. In addition, Japanese Industrial Standards (JIS R1660-2) exemplifies an open resonator wherein an opening diameter of a reflection spherical surface is 80 to 205 mm in two spherical reflection mirrors, a curvature radius R of the two spherical reflection mirrors is same as the opening diameter of the reflection spherical surface, and the distance D between spherical surfaces of the two spherical reflection mirrors is normally 1.2 times of the opening diameter (1.1 to 1.3 times depending on the value of tan δ).

When the dielectric characteristic of the sample is measured by using the Fabry-Perot resonator, it is known that the resonance of the TEMmnq mode is generated as an unnecessary higher-order mode although the resonance used for the measurement is the TEM00q mode. The order m is the order (degree) in the rotation direction and the order n is the order (degree) in the radial direction. The order q is the order (degree) in the z-direction (direction connecting centers of two spherical reflection mirrors). The order q corresponds to the number of the standing waves present between the two spherical reflection mirrors (the number of standing waves=q+1). The resonance of the TEM00q mode includes the mode (symmetric mode) where the antinode of the standing waves is located at the center and the mode (asymmetric mode) where the node of the standing waves is located at the center. The resonance used for the measurement of the dielectric characteristic is the symmetric mode and the order q is an even number in the symmetric mode. The order m other than zero is merely generated and the order n is a natural number in the range of approximately 1 to 5 in the resonance of the higher-order mode generated in a realistic Fabry-Perot resonator. Thus, the mode is the TEM0nq mode. The resonance of the TEM0nq mode is generated at the frequency slightly higher than the frequency of the resonance of the TEM00q mode.

FIGS. 10A, 10B-1 and 10B-2 are conceptual diagrams for explaining resonance modes in the Fabry-Perot resonator. FIG. 10A shows the resonance of the TEM00q mode, FIG. 10B-1 shows the resonance of the TEM01q mode in the TEM0nq mode, and FIG. 10B-2 shows the resonance of the TEM02q mode in the TEM0nq mode. As shown in FIGS. 10A, the resonance of the TEM00q mode has a spread approximated by a Gauss distribution around a center axis connecting the centers of spherical reflection mirrors 60 facing to each other. On the other hand, as shown in FIGS. 10B-1 and 10B-2, the resonance of the TEM0nq mode has a larger spread width from the center axis compared to the TEM00q mode.

When the sample is mounted on the Fabry-Perot resonator for measuring the dielectric characteristic, the resonance frequency is changed (shifted) in each mode from the state that the sample is not mounted. The measurement error may occur or the measurement may be impossible depending on the sample when the resonance frequency of the TEM00q mode used for the measurement is shifted and the resonance waveform of the TEM00q mode is overlapped with the resonance waveform of the TEM0nq mode. Therefore, the above described JIS recommends that an aperture (optical diaphragm) made of vinyl chloride (PVC) or the like and capable of changing the diameter (diaphragm diameter) is inserted between a sample stand and one of the spherical reflection mirrors 60 to reduce an unnecessary resonance of the TEM0nq mode. FIGS. 11A and 11B are conceptual diagrams for explaining the operation of the aperture in the Fabry-Perot resonator. As shown in FIG. 11A, in the resonance of the TEM00q mode, since the spread from the center axis connecting the centers of the spherical reflection mirrors 60 facing to each other is small, the resonance is not influenced almost at all from an aperture diaphragm of an aperture 61. On the other hand, as shown in FIG. 11B, in the resonance of the TEM0nq mode, since the resonance is spread in the radial direction of the spherical reflection mirrors 60, the resonance is interrupted by the aperture 61 and suppressed.

SUMMARY OF THE INVENTION

The present disclosure provides an open resonator capable of measuring a dielectric characteristic of a sample more precisely and more efficiently compared to the case of using an aperture by suppressing the resonance of an unnecessary higher-order mode (in particular TEM04q mode) while minimizing the influence to the resonance mode (TEM00q mode) used for the measurement of the dielectric characteristic.

The open resonator of the present disclosure includes: a first spherical reflection mirror having a first reflection spherical surface; and a second spherical reflection mirror having a second reflection spherical surface arranged to face the first reflection spherical surface. At least one of diameters of opening surfaces of the first reflection spherical surface and the second reflection spherical surface exposed to a space between the first reflection spherical surface and the second reflection spherical surface is equal to or less than a half of a distance between the first reflection spherical surface and the second reflection spherical surface.

When the open resonator of the present disclosure is used, the dielectric characteristic of the sample can be measured more precisely and more efficiently compared to the case of using the aperture by suppressing the resonance of an unnecessary higher-order mode while minimizing the influence to the resonance mode used for the measurement of the dielectric characteristic.

Figure 2A:
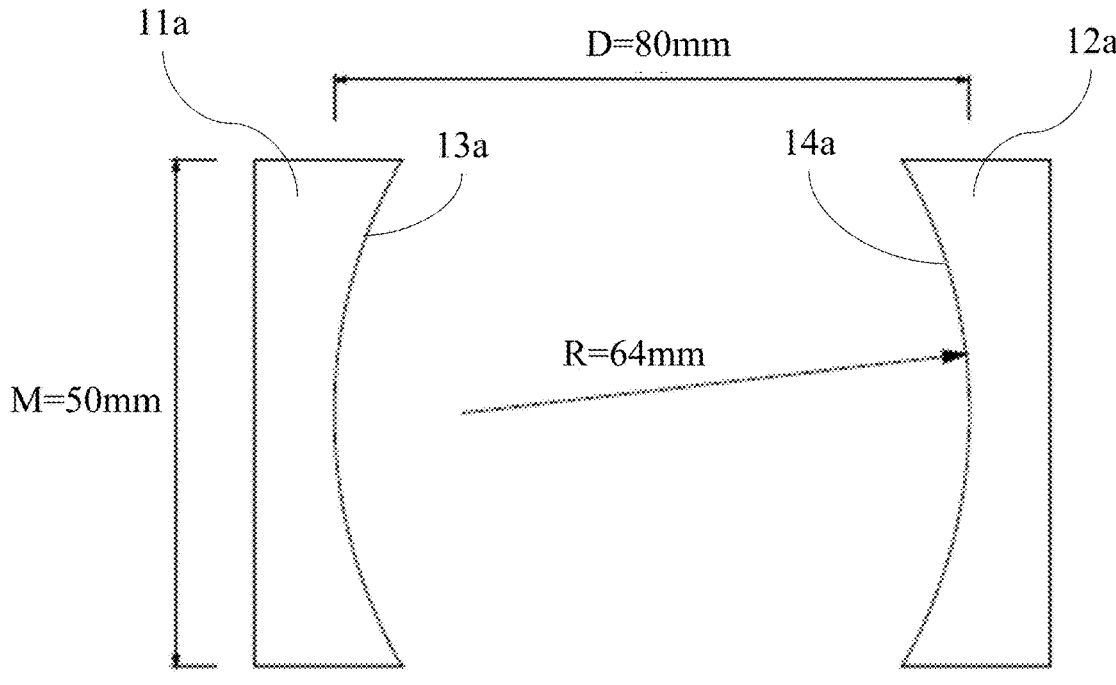
FIG. 2A and FIG. 2B are schematic diagrams showing an opening diameter M, a distance D between spherical surfaces and a curvature radius R in two reflection spherical surfaces of the Fabry-Perot resonator concerning Embodiment 1 (FIG. 2A: Comparative example 1a, FIG. 2B: Example 1).

Figure 3:
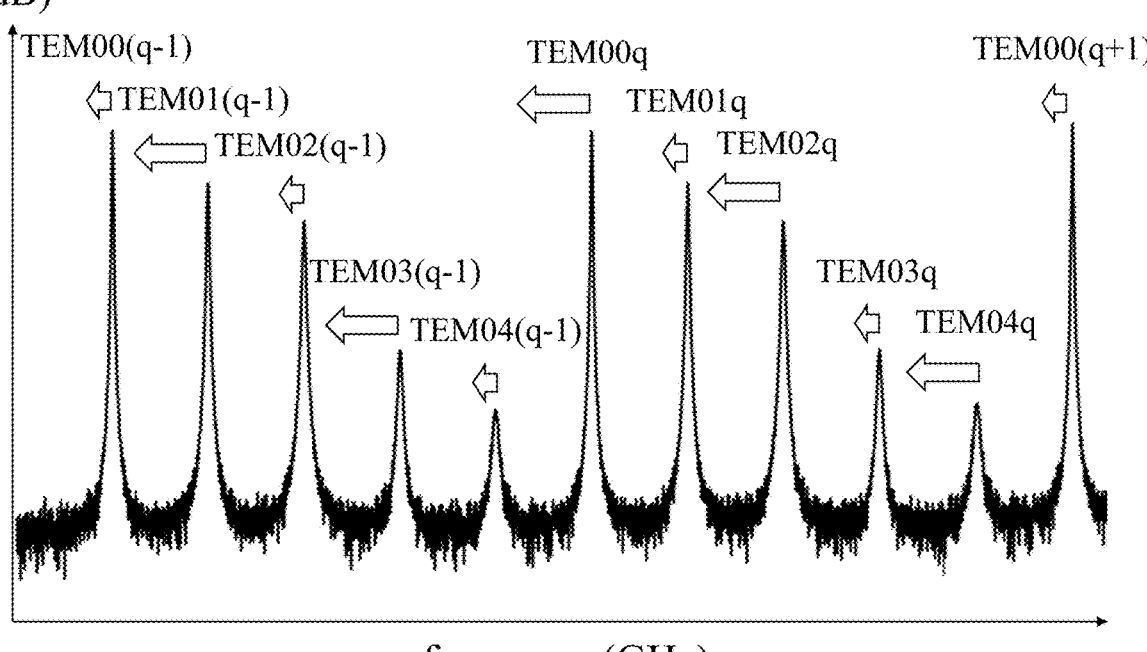

FIG. 3 is a conceptual diagram for explaining resonance modes measured by the Fabry-Perot resonator.

Figure 4A:
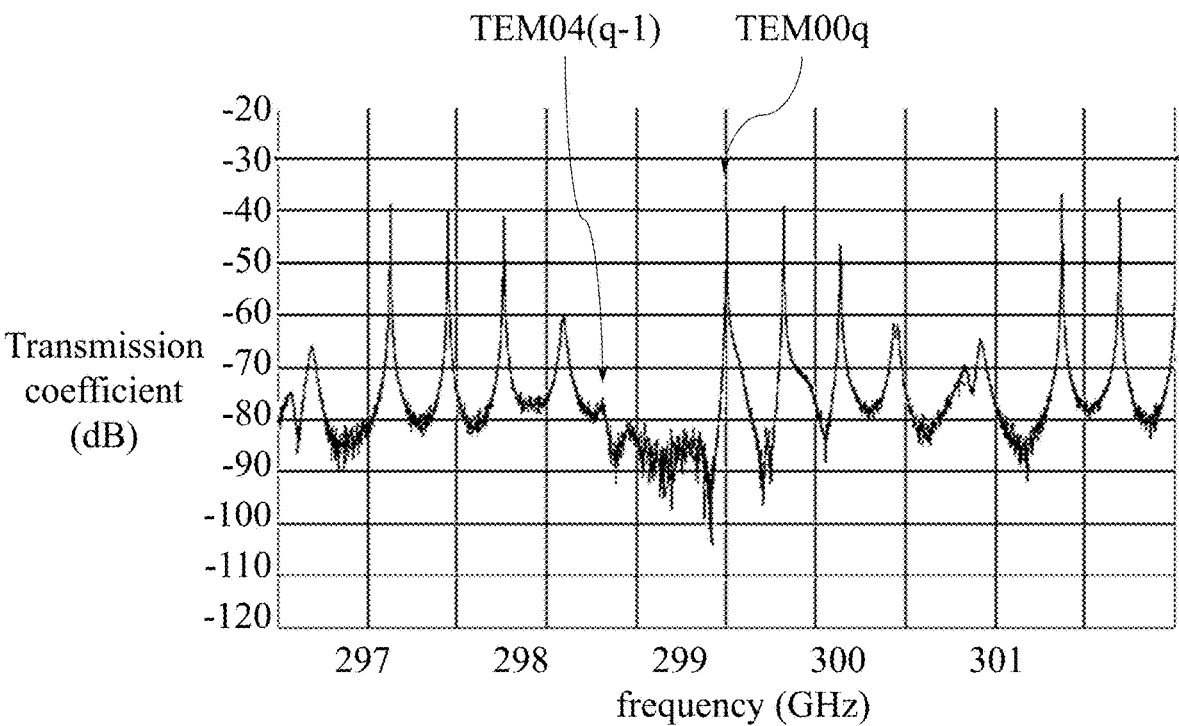
Figure 4B:
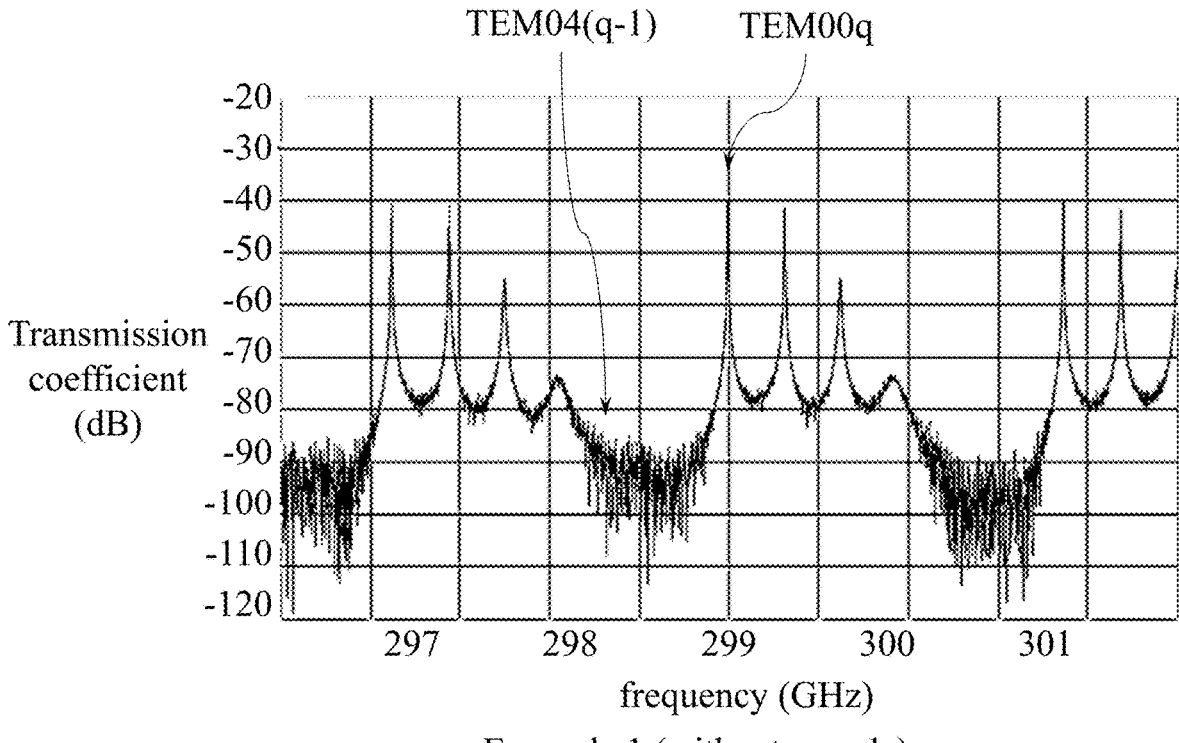

FIG. 4A and FIG. 4B are drawings showing resonance waveforms measured by the Fabry-Perot resonator of Embodiment 1 in a state that a measurement sample is not mounted (FIG. 4A: Comparative example 1a, FIG. 4B: Example 1).

Figures 5A, 5B:
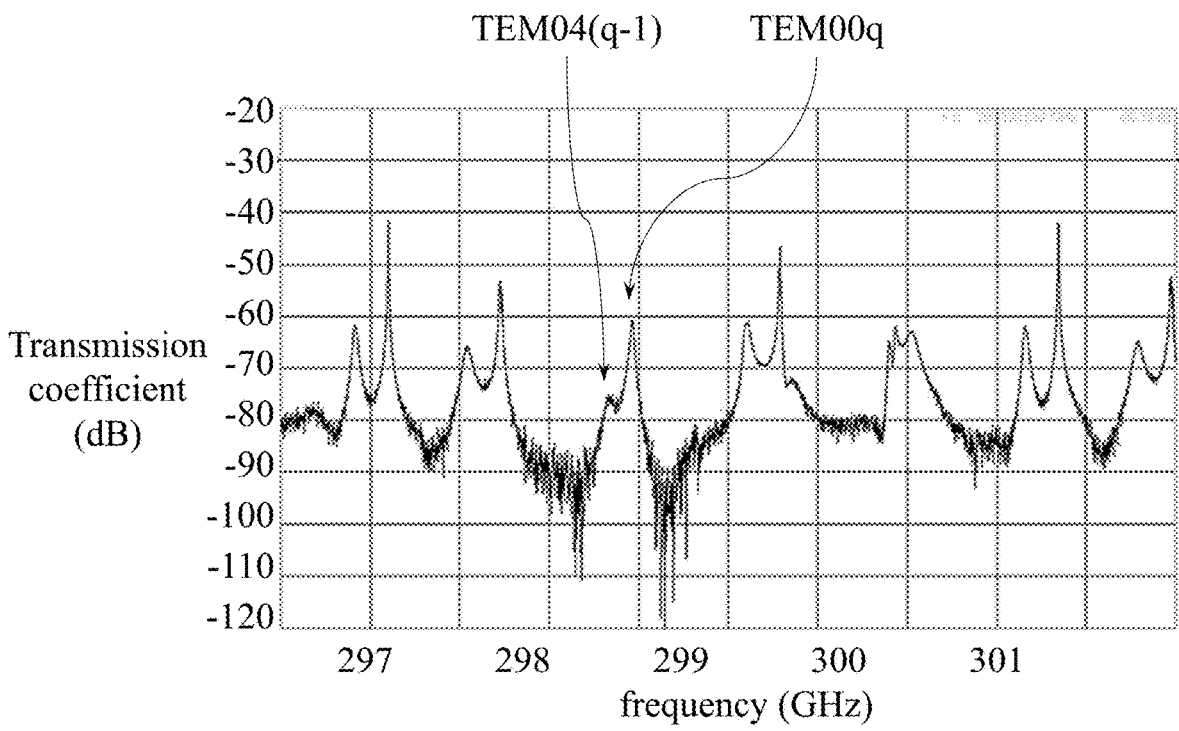

FIG. 5A and FIG. 5B are drawings showing resonance waveforms measured by the Fabry-Perot resonator of Embodiment 1 in a state that a measurement sample is mounted (FIG. 5A: Comparative example 1a, FIG. 5B: Example 1).

Figure 6A:
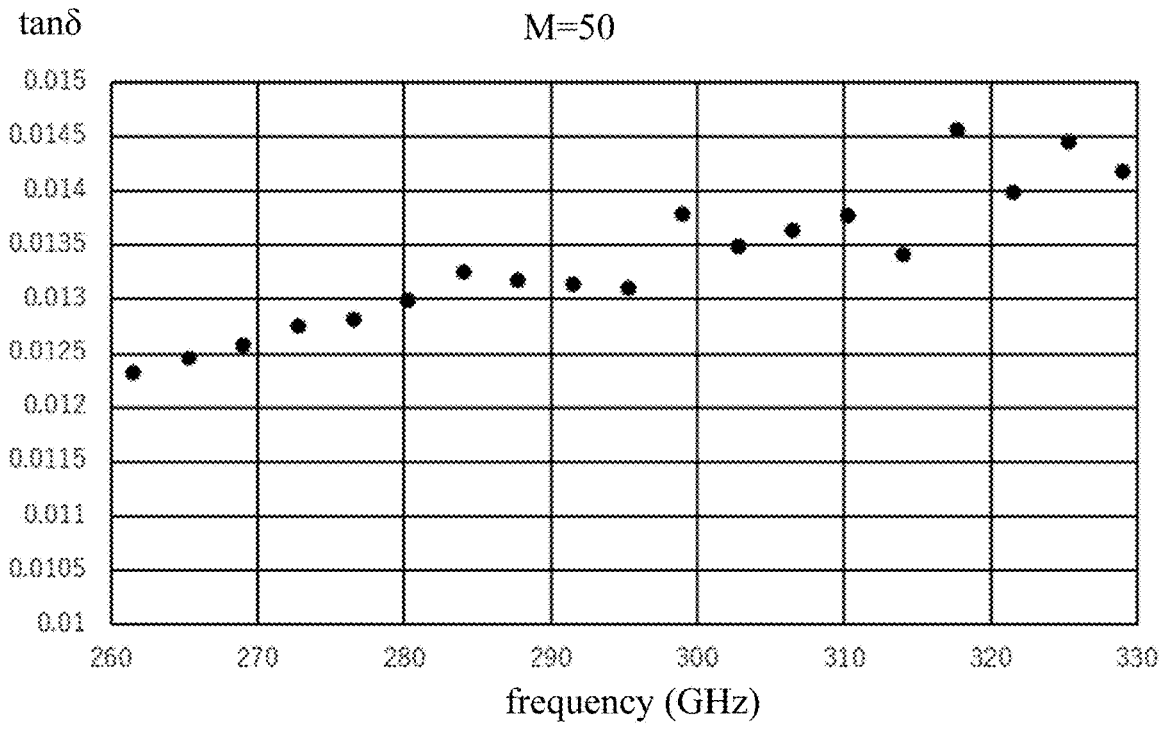
Figure 6B:
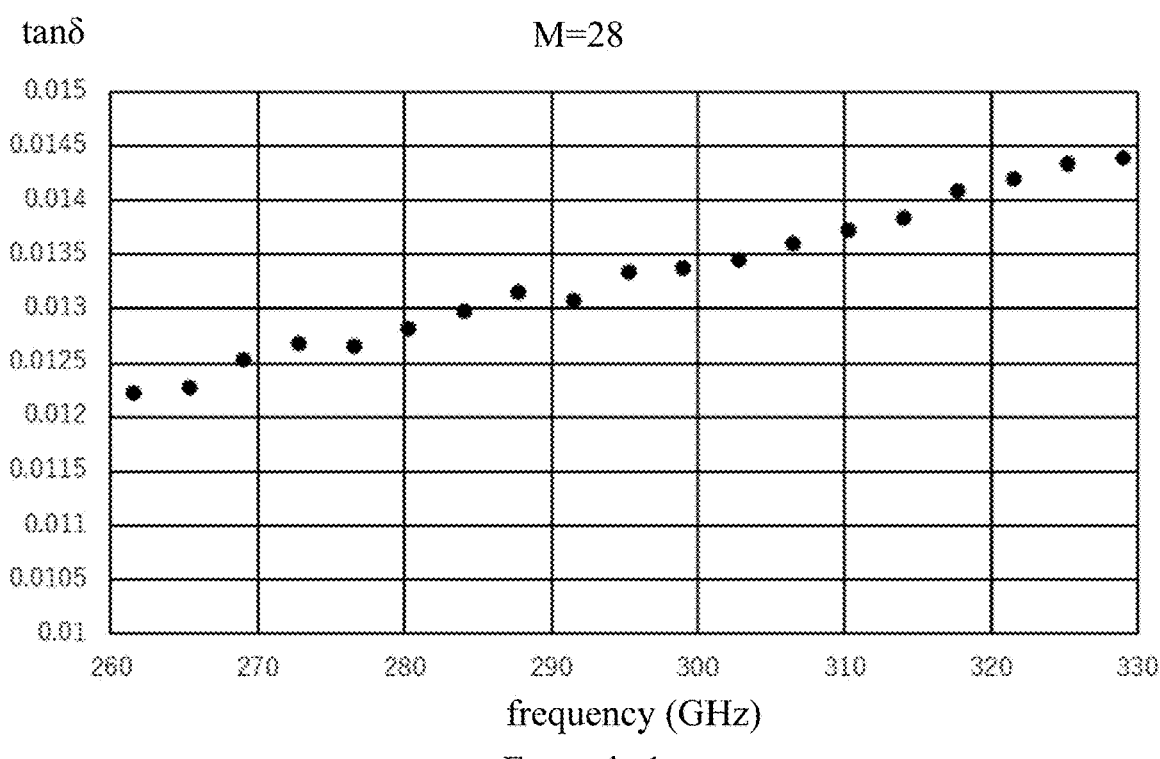

FIG. 6A and FIG. 6B are drawings showing dielectric tangent (tan 8) measured by the Fabry-Perot resonator of Embodiment 1 (FIG. 6A: Comparative example 1a, FIG. 6B: Example 1).

Figure 7A:
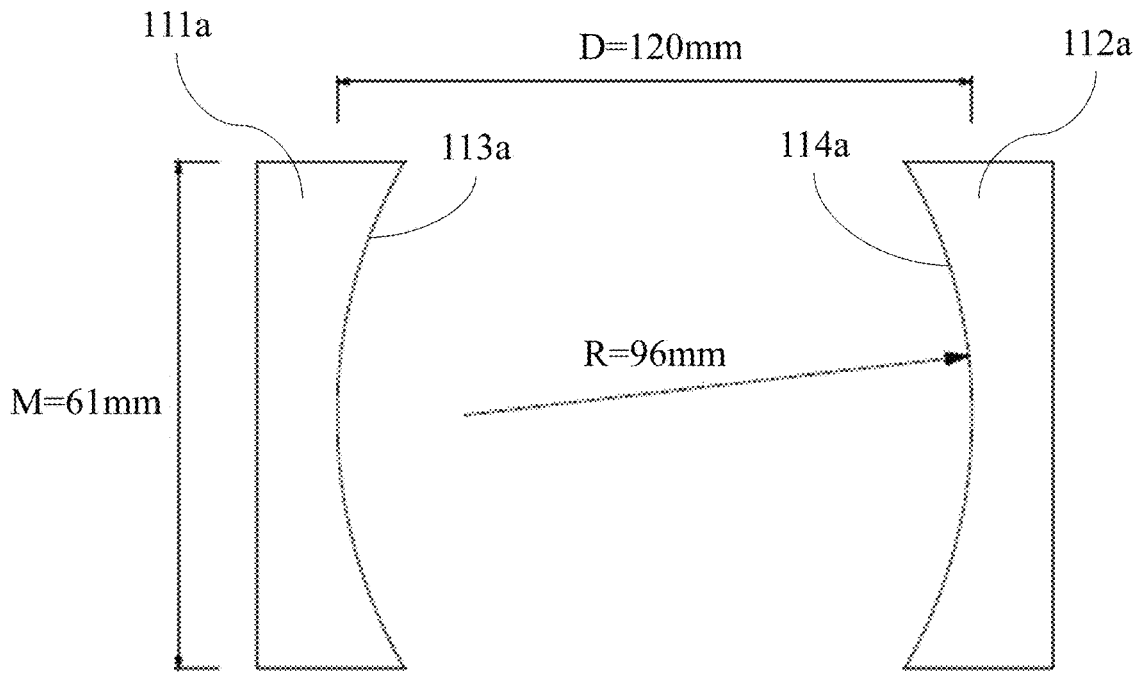
Figure 7B:
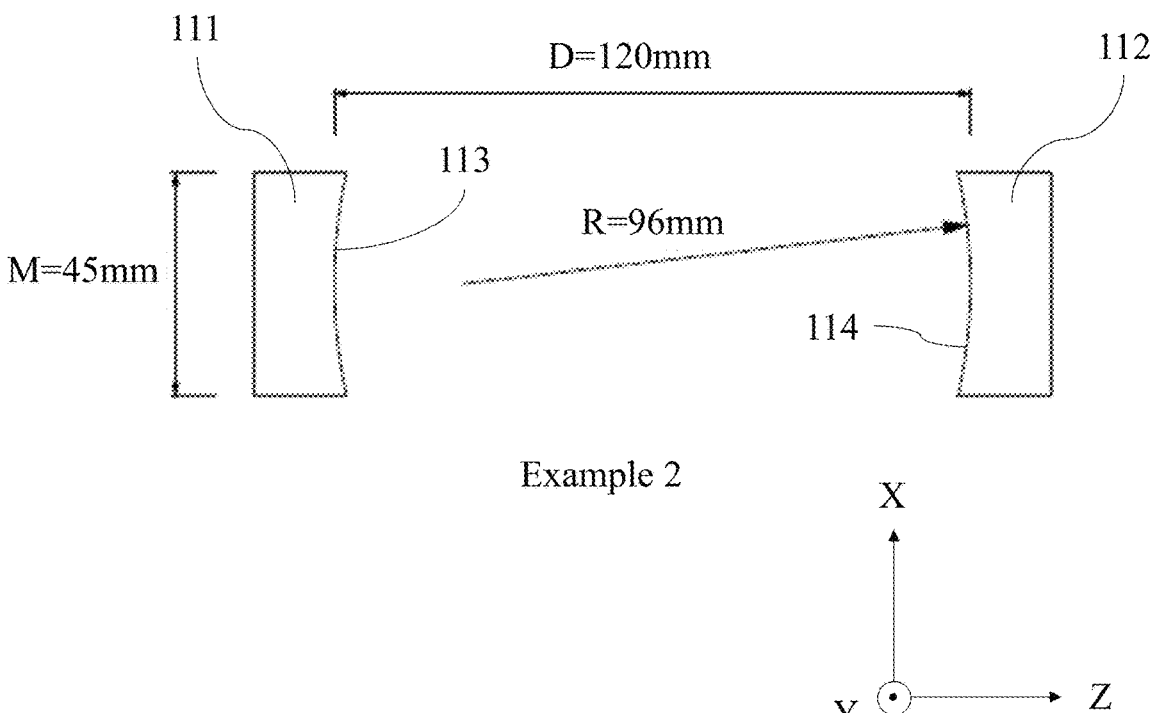

FIG. 7A and FIG. 7B are schematic diagrams showing an opening diameter M, a distance D between spherical surfaces and a curvature radius R in two reflection spherical surfaces of the Fabry-Perot resonator concerning Embodiment 2 (FIG. 7A: Comparative example 2a, FIG. 7B: Example 2).

Figure 8A:
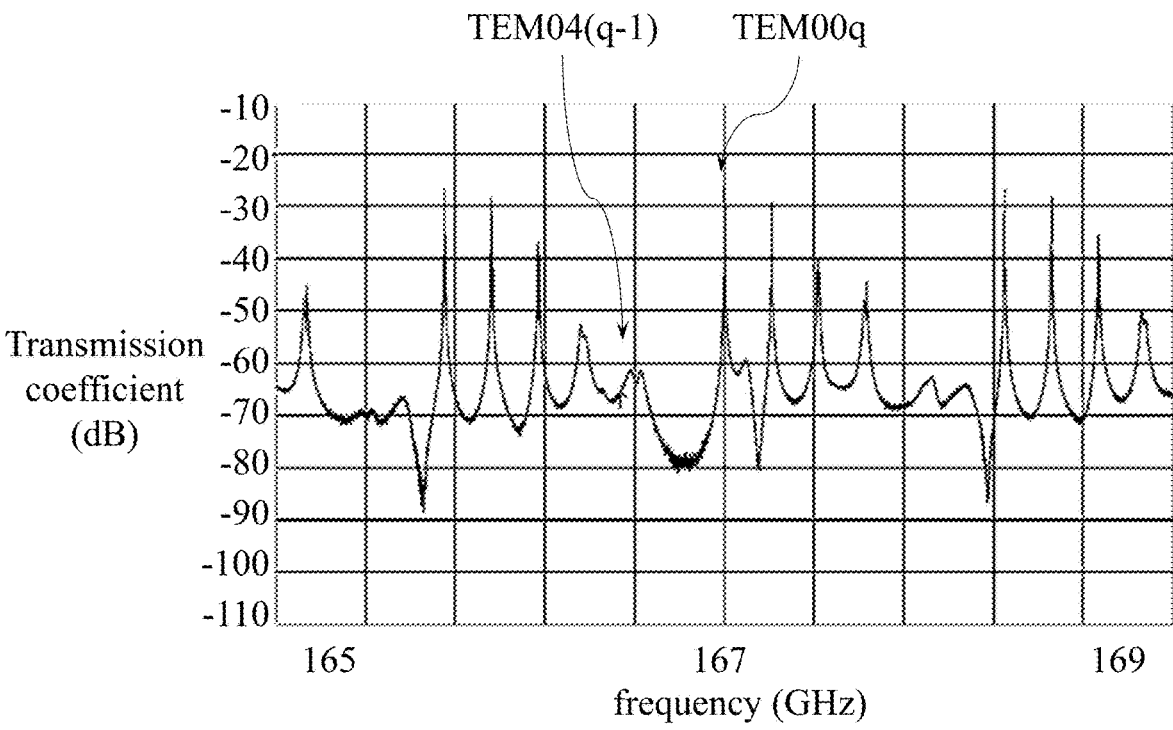
Figure 8B:
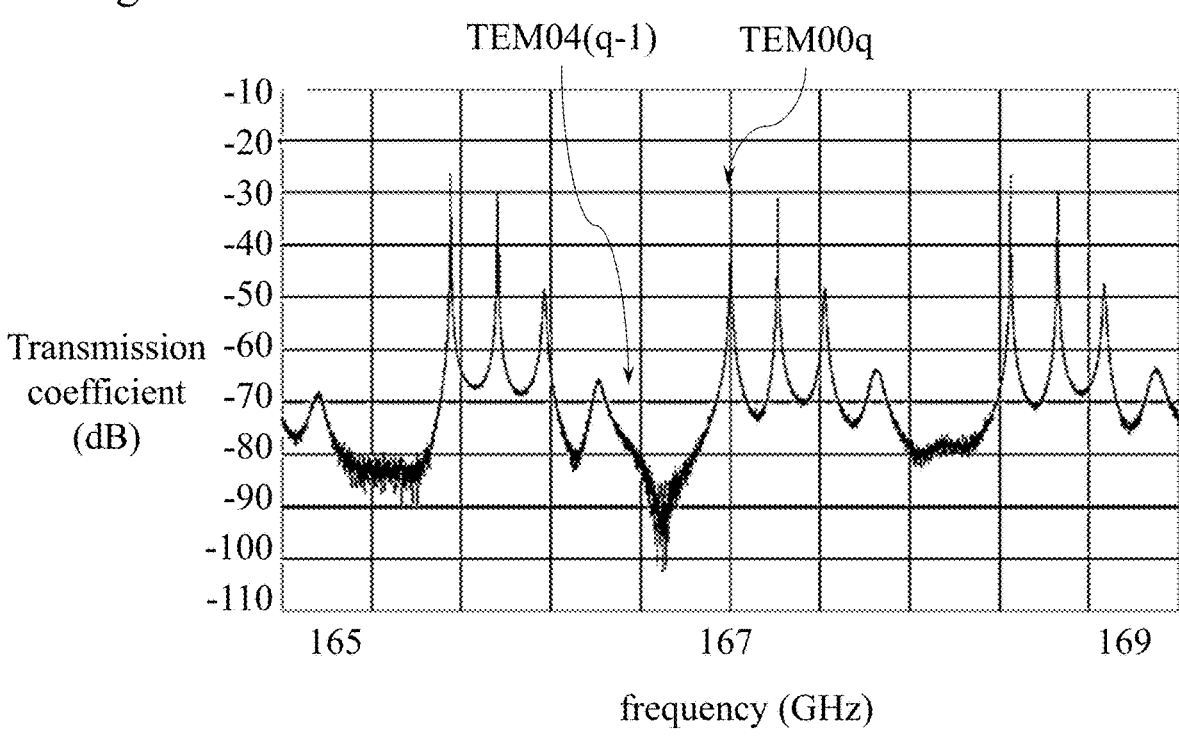

FIG. 8A and FIG. 8B are drawings showing resonance waveforms measured by the Fabry-Perot resonator of Embodiment 2 in a state that a measurement sample is not mounted (FIG. 8A: Comparative example 2a, FIG. 8B: Example 2).

FIG. 9 is a drawing summarizing results of the resonance measurement measured by the Fabry-Perot resonator as Embodiment 3.

Figure 10A:
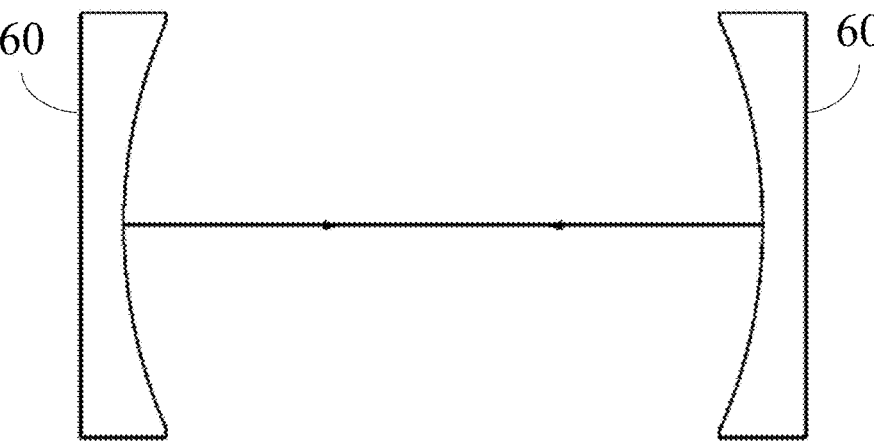
Figures 1, 10B:
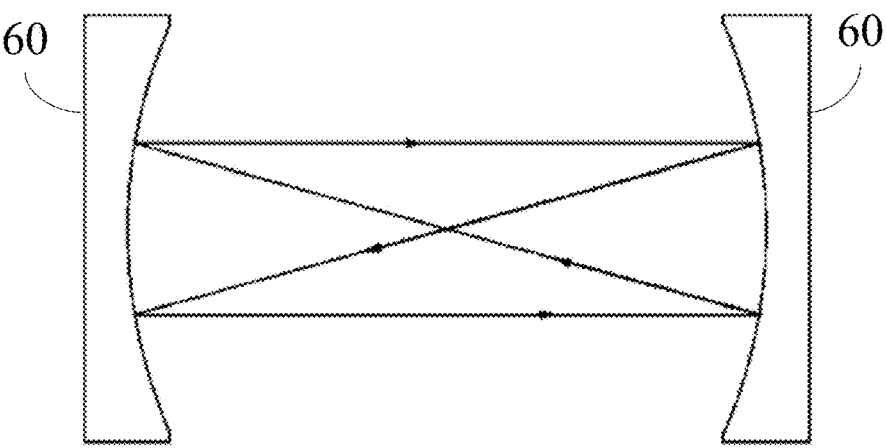
Figures 2, 10B:
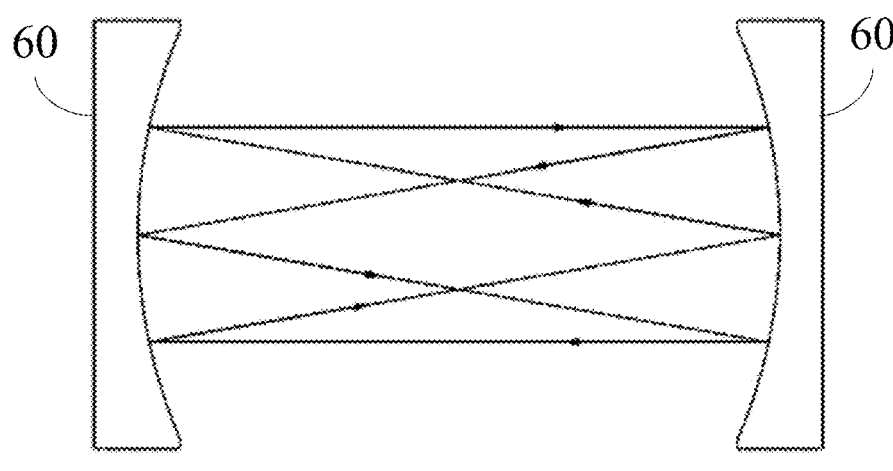

FIGS. 10A, 10B-1 and 10B-2 are conceptual diagrams for explaining resonance modes in the Fabry-Perot resonator (FIG. 10A: TEM00q mode, FIG. 10B-1: TEM0nq (TEM01q) mode, FIG. 10B-2: TEM0nq (TEM02q) mode).

Figure 11A:
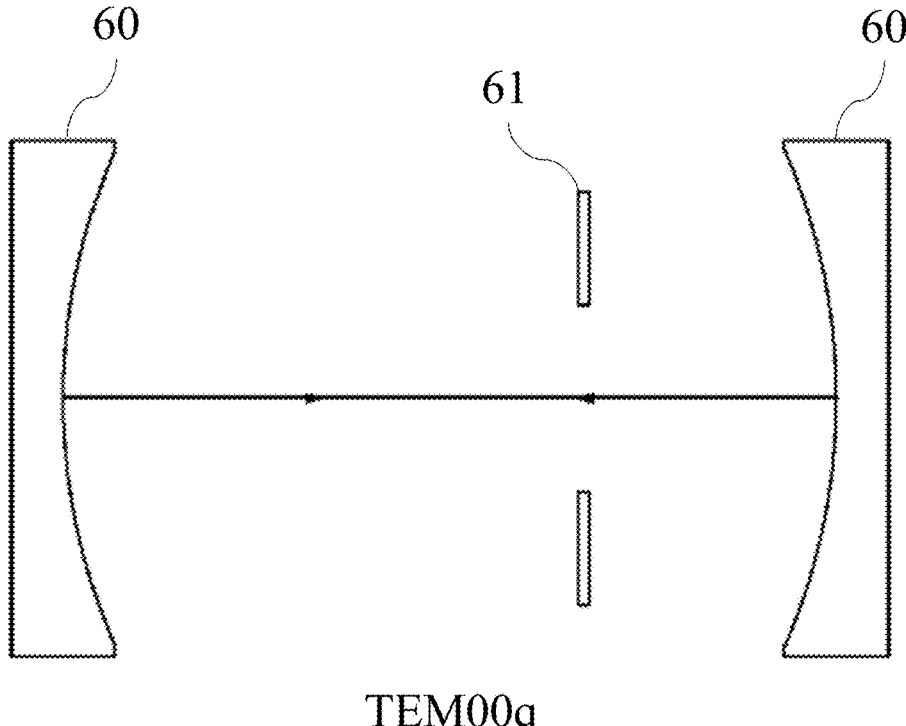
Figure 11B:
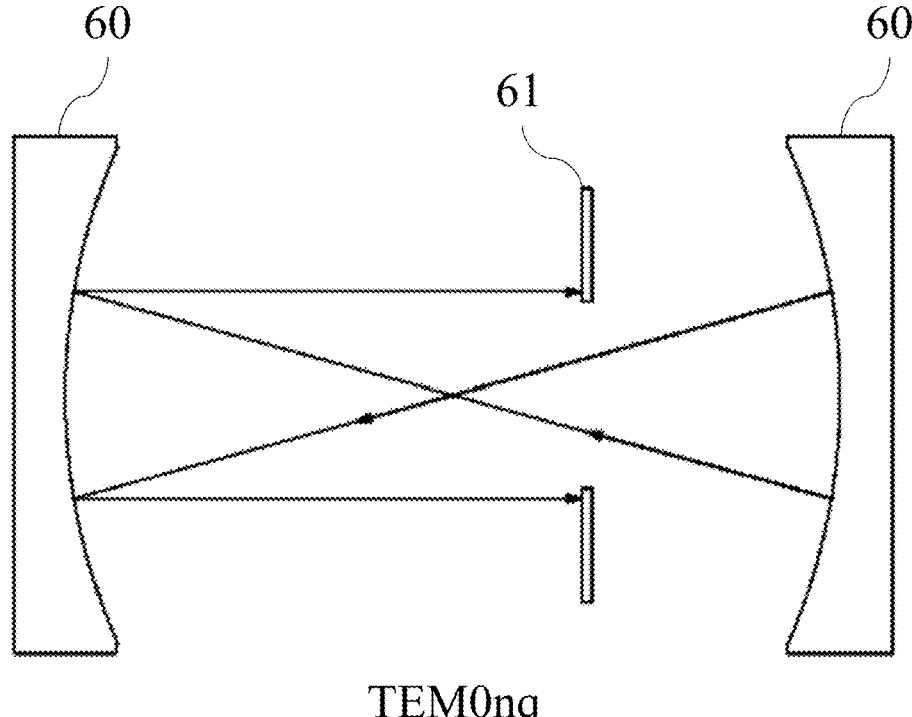

FIGS. 11A and 11B are conceptual diagrams for explaining the operation of the aperture in the Fabry-Perot resonator (FIG. 11A: TEM00q mode, FIG. 11B: TEM0nq mode).

DETAILED DESCRIPTION OF THE INVENTION

Embodiment 1

Figure 1:
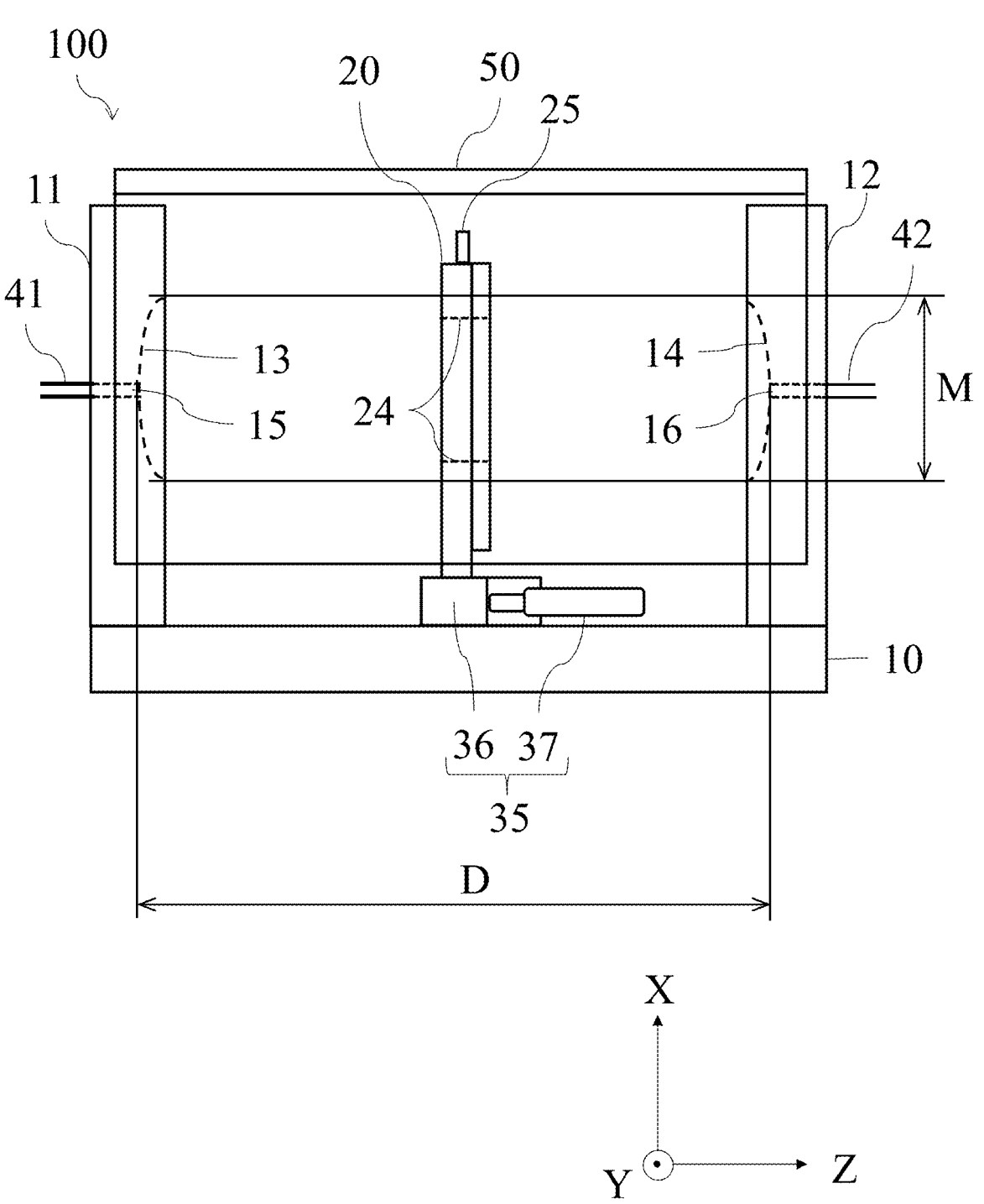
FIG. 1 is a schematic diagram of a Fabry-Perot resonator concerning Embodiment 1.

FIG. 1 is a schematic diagram of the Fabry-Perot resonator concerning Embodiment 1. As shown in FIG. 1, a Fabry-Perot resonator 100 concerning Embodiment 1 includes a fixing stand 10, a first spherical reflection mirror 11, a second spherical reflection mirror 12, a sample stand 20, a position adjustment mechanism 35 and a cover 50. The Fabry-Perot resonator 100 is an example of the open resonator. In the following explanation, the explanation will be made by using the XYZ coordinate system shown in FIG. 1. The X-direction corresponds to the up-down direction, the Y-direction corresponds to the front-rear direction and the Z-direction corresponds to the left-right direction.

As shown in FIG. 1, the first spherical reflection mirror 11 having a first reflection spherical surface 13 and the second spherical reflection mirror 12 having a second reflection spherical surface 14 are arranged on the fixing stand 10 to face each other. At this time, the center of the first reflection spherical surface 13 and the center of the second reflection spherical surface 14 are separated from each other at a predetermined spherical surface distance D (distance between two spherical surfaces). A first waveguide 41 and a second waveguide 42 are arranged (formed) respectively on the center of the first reflection spherical surface 13 and the center of the second reflection spherical surface 14. A first coupling hole 15 having a minute diameter and a second coupling hole 16 having a minute diameter are formed respectively on front end opening portions (spherical surface side) of the first waveguide 41 and the second waveguide 42 to form a coupled state for obtaining the desired resonance characteristics. The first waveguide 41 of the first spherical reflection mirror 11 is a signal injection portion to input a measurement signal for measuring the dielectric characteristic of the sample from the first waveguide 41. The second waveguide 42 of the second spherical reflection mirror 12 is a signal detection portion to output the detection signal from the second waveguide 42.

As shown in FIG. 1, the sample stand 20 includes a through hole 24. The sample stand 20 is arranged between the first spherical reflection mirror 11 and the second spherical reflection mirror 12 which face each other. A sample 25 is mounted on the sample stand 20 for measuring the dielectric characteristic of the sample 25. The sample 25 mounted on the sample stand 20 is exposed from the through hole 24. A diameter of the through hole 24 is specified to be smaller than the opening diameter M of the first and second reflection spherical surfaces 13, 14.

As shown in FIG. 1, the position adjustment mechanism 35 includes a base 36 and a micrometer 37. The base 36 is installed so that the base 36 can be moved (slid) in the Z-direction with respect to the fixing stand 10 (i.e., the first spherical reflection mirror 11 and the second spherical reflection mirror 12). The operator can move the base 36 by operating the micrometer 37. The sample stand 20 is fixed to the base 36. Namely, by operating the micrometer 37, the operator can move the sample stand 20 fixed to the base 36 via the base 36 and adjust the position of the sample 25 mounted on the sample stand 20 in the Z-direction.

The cover 50 is formed in a U shape by a front board, a back board and a top board connecting the front board with the back board. The front board, the back board and the top board are formed of a transparent acrylic plate. As shown in FIG. 1, when measuring the dielectric characteristic, the front board, the back board and the top board of the cover 50 respectively cover the front surface, back surface and the top surface of the Fabry-Perot resonator 100. When mounting the sample 25 on the sample stand 20, the cover 50 is slid upward and detached from the Fabry-Perot resonator 100. Thus, a space between the first spherical reflection mirror 11 and the second spherical reflection mirror 12 (i.e., space where the sample stand 20 is arranged) is exposed.

Figure 2B:
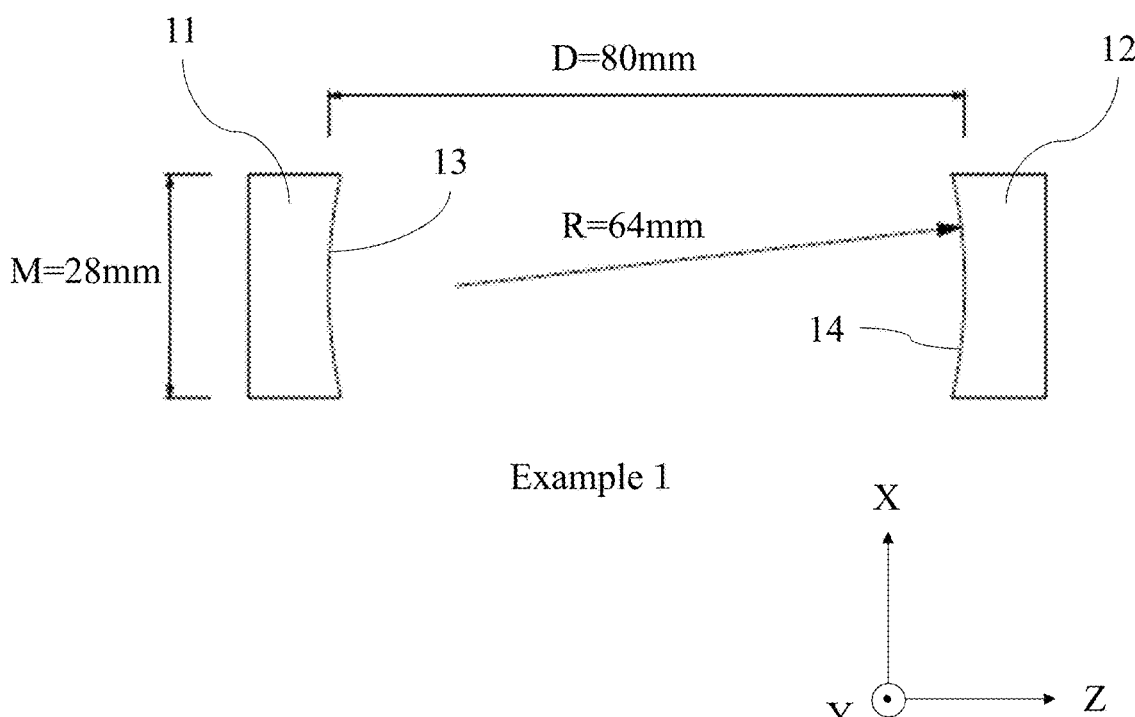

FIGS. 2A and 2B are schematic diagrams showing an opening diameter M, a distance D between spherical surfaces and a curvature radius R in two reflection spherical surfaces of the Fabry-Perot resonator concerning Embodiment 1. FIG. 2A shows Comparative example 1a and FIG. 2B shows Example 1. As shown in FIG. 1, FIGS. 2A and 2B, the whole of the first reflection spherical surfaces 13, 13a and the second reflection spherical surfaces 14, 14a are exposed to a space between the first reflection spherical surface and the second reflection spherical surface in Embodiment 1. Thus, the diameter of the reflection spherical surfaces is identical to the opening diameter M (corresponding to the diameter of the opening surface) of the reflection spherical surfaces.

The opening diameter M, the distance D between spherical surfaces and the curvature radius R of the reflection spherical surfaces of Comparative example 1a and Example 1 shown in FIGS. 2A and 2B are as follows. In the Fabry-Perot resonator 100 concerning Embodiment 1, the distance D between spherical surfaces is set to 80 mm corresponding to the band width of a relatively high measurement frequency (J band: 220 to 330 GHz).

Opening diameter M of reflection spherical surfaces: 50 mm (Comparative example 1a), 28 mm (Example 1)

Curvature radius R: 64 mm (Comparative example 1a and Example 1)

Distance D between spherical surfaces: 80 mm (Comparative example 1a and Example 1)

Namely, in Comparative example 1a, the opening diameter M of the reflection spherical surfaces is larger than a half ($\frac{1}{2}$) of the distance D between spherical surfaces and larger than a half ($\frac{1}{2}$) of the curvature radius R. On the other hand, in Example 1, the opening diameter M of the reflection spherical surfaces is equal to or less than a half of the distance D between spherical surfaces and equal to or less than a half of the curvature radius R. Note that the explanation of the configurations other than the first and second spherical reflection mirrors 11a, 12a and the first and second reflection spherical surfaces 13a, 14a of the Fabry-Perot resonator of Comparative example 1a is omitted since the configurations are same as those of the Fabry-Perot resonator 100 of Example 1.

(Measurement of Dielectric Characteristic)

The steps of the measurement of the dielectric characteristic measured by the Fabry-Perot resonator 100 are shown below.

1) The Fabry-Perot resonator 100, the network analyzer and the controller are connected with each other via cables.

2) In a state that the sample is not mounted (without the sample), the resonance characteristic (first resonance characteristic) is measured in the resonance frequency to be measured. The Q value $Q_{empty}$ is calculated from a band width of a resonance waveform.

3) The resonance frequencies are measured at five points including the frequency to be measured and the frequencies before and behind it. The spherical surface distance D between the reflection spherical surfaces is calculated from the resonance frequencies of the five points.

4) After the cover 50 is detached and the sample 25 is mounted on the sample stand 20, a space between the first spherical reflection mirror 11 and the second spherical reflection mirror 12 is covered with the cover 50.

5) The micrometer 37 is operated to adjust the position of the sample 25. Namely, the position of the sample 25 is aligned with the position where the resonance frequency becomes the minimum.

6) In a state that the position of the sample 25 is adjusted (with sample), the resonance characteristic (second resonance characteristic) is measured in the resonance frequency to be measured. The center frequency (resonance frequency $F_{sample}$) and the Q value $Q_{sample}$ are calculated for the resonance shifted by inserting the sample 25.

7) The relative dielectric constant E' and the dielectric tangent tan 8 of the sample are calculated from the thickness t of the sample 25, the spherical surface distance D, the Q value $Q_{empty}$ measured without the sample, the resonance frequency $F_{sample}$ measured with the sample and the Q value $Q_{sample}$ measured with the sample.

When measuring the dielectric characteristic in a plurality of frequencies for the same sample 25, after the above described step 1), the above described steps 2) and 3) are performed for all frequencies to be measured. Then, after the above described steps 4) and 5) are performed, the above described steps 6) and 7) are performed for all frequencies to be measured.

Next, the resonance modes excited in the Fabry-Perot resonator will be explained. FIG. 3 is a conceptual diagram for explaining the resonance modes excited in the Fabry-Perot resonator. In FIG. 3, the resonance waveform measured when measuring the resonance characteristic without the sample in the above described step 2) is shown together with the corresponding resonance mode. In addition, the arrow marks shown in FIG. 3 show the predicted shift direction and change amount (shift amount) of the resonance frequency in each resonance mode when the resonance characteristic is measured with the sample in the above described step 6).

The resonance used for the measurement of the dielectric characteristic is the TEM00q mode. The resonance of the TEM00(q–1) mode is observed on the low frequency side of the resonance frequency of the TEM00q mode, while the resonance of the TEM00(q+1) mode is observed on the high frequency side of the resonance frequency of the TEM00q mode. The TEM00q mode, the TEM00(q–1) mode and the TEM00(q+1) mode are the resonance where the signal intensity is spread in a Gauss distribution around a center axis connecting the centers of the two reflection spherical surfaces facing to each other. In the TEM00q mode, the antinode of the standing waves is located at the center of the center axis. In the TEM00(q–1) mode and the TEM00(q+1) mode, the node of the standing waves is located at the center of the center axis. The resonances of TEM0n(q–1) mode and the TEM0nq mode appear respectively at the frequency between the TEM00q mode and the TEM00(q–1) mode and the frequency between the TEM00q mode and the TEM00 (q+1) mode. FIG. 3 shows the resonance of the TEM0n(q–1) mode and the TEM0nq mode in the case where the order n is 1 to 4.

When the sample 25 is mounted and the sample 25 is located at the antinode of the resonance of the TEM00q mode (center of the resonator) in the above described step 6), the resonance mode having relatively large shift amount of the resonance frequency to be measured and the resonance mode having relatively small shift amount of the resonance frequency to be measured appear alternately as shown in the arrow marks of FIG. 3. In the arrow marks of FIG. 3, the resonance mode having large shift amount is the resonance where the antinode is formed at the center (where the sample is located) of the resonator, while the resonance mode having small shift amount is the resonance where the node is formed at the center. Since the resonance of the TEM00q mode is used for measuring the dielectric characteristic, the sample 25 is located at the antinode of the resonance (center of the resonator) and the shift amount of the resonance frequency is relatively large. The shift amount varies depending on the kind and the thickness t of the sample 25. For example, when the sample 25 of the modified polyimide (MPI) having the thickness t of 50 μm and the sample 25 of polycarbonate (PC) having the thickness t of 98 μm are compared, the shift amount of the resonance frequency is large in the sample 25 of polycarbonate. When the shift amount of the resonance frequency of the TEM00q mode used for the measuring the dielectric characteristic is large, the shift amount of the resonance frequency of the TEM04(q–1) mode which is located at low frequency side of the TEM00q mode is relatively small. Thus, when the resonance characteristic is measured in a state that the sample 25 is mounted, the resonance waveform of the TEM00q mode is superimposed on the resonance waveform of the TEM04(q–1) mode and the resonance waveform of the TEM00q mode is distorted. Consequently, the dielectric characteristic of the sample 25 may not be measured correctly. In a realistically designed Fabry-Perot resonator, the resonance having the order n of 5 or more rarely occurs in the TEM0n(q–1) mode. In addition, as shown in FIG. 3, the resonance frequency of the TEM03(q–1) mode is shifted in the same direction as the TEM00q mode and approximately the same amount as the TEM00q mode, and the resonance frequency of the TEM02(q–1) mode is significantly separated from the TEM00q mode. Thus, there is no influence in the actual measurement. Accordingly, in order to measure the dielectric characteristic of the sample 25 more correctly, it is required to reduce the resonance of the TEM04(q–1) mode sufficiently.

The amplitude (intensity) of the resonance such as the TEM00q mode and the TEM04(q–1) mode tends to be relatively large at the high frequency side of the band width of the measurement frequency (220 to 330 GHz in Embodiment 1) while the amplitude (intensity) tends to be relatively small at the low frequency side. At the high frequency side, since the wavelength of the input signal is short, the input signal easily passes through the coupling hole and the spread due to diffraction is small. Thus, the effect of reducing the opening diameter M of the reflection spherical surfaces (reducing the diaphragm diameter when using the aperture 61) hardly appears and the amplitude of each resonance mode becomes large. At the low frequency side, since the wavelength of the input signal is long, the input signal hardly passes through the coupling hole and the spread due to diffraction is large. Thus, the effect of reducing the opening diameter M of the reflection spherical surfaces (reducing the diaphragm diameter when using the aperture 61) easily appears, the amplitude of each resonance mode becomes small and the Q value deteriorates. Accordingly, in order to measure the dielectric characteristic of the sample 25 more correctly, it is required that the resonance of the TEM04(q–1) mode is reduced sufficiently since the amplitude becomes large at the high frequency side and the amplitude and the Q value of the resonance of the TEM00q mode are kept sufficiently since the amplitude becomes small and the Q value deteriorates at the low frequency side.

Next, the result of measurement of the resonance using the Fabry-Perot resonator having the opening diameter M, the distance D between spherical surfaces and the curvature radius R of Comparative example 1a and Example 1 shown in FIGS. 2A and 2B will be explained. FIG. 4A and FIG. 4B are drawings showing the resonance waveform measured in a state that a measurement sample is not mounted. FIG. 4A shows Comparative example 1a and FIG. 4B shows Example 1. In Comparative example 1a shown in FIG. 4A, the aperture 61 made of vinyl chloride is inserted between the sample stand 20 and the second reflection spherical surface 14a and the measurement is performed in a state that the diaphragm diameter of the aperture 61 is adjusted so that an unnecessary higher-order resonance of the TEM04(q–1) mode is reduced at the maximum within such a range as not to significantly affect the resonance of the TEM00q mode required for the measurement. In Example 1 shown in FIG. 4B, the aperture is not used.

As shown in FIG. 4A and FIG. 4B, the input signal of 299 GHz is used as the measurement frequency and the resonance of the TEM00q mode used for measuring the dielectric characteristic is observed at around 299 GHz in both Comparative example 1a and Example 1. In addition, in Comparative example 1a, as shown in FIG. 4A, the resonance of the TEM04(q–1) mode, which is the higher-order mode, is observed at around the frequency of 298.3 GHZ. Namely, in Comparative example 1a, even if the diaphragm diameter of the aperture 61 is optimized, the resonance of the TEM04(q–1) mode, which obstructs the measurement, cannot be eliminated when the measurement is performed while keeping the amplitude and the Q value of the resonance of the TEM00q mode to the required extent. On the other hand, in Example 1, the resonance is not observed at around the frequency of 298.3 GHZ as shown in FIG. 4B. Namely, in the Fabry-Perot resonator 100 of Example 1, since the opening diameter M (28 mm) of the reflection spherical surfaces is set smaller compared to the opening diameter M (50 mm) of Comparative example 1a, the resonance of the TEM04(q–1) mode, which obstructs the measurement, is efficiently removed without significantly affecting the resonance of the TEM00q mode.

FIG. 5A and FIG. 5B are drawings showing resonance waveforms measured by the Fabry-Perot resonator in a state that the measurement sample is mounted. FIG. 5A shows Comparative example 1a and FIG. 5B shows Example 1. The polycarbonate having the thickness t of 98 μm is used as the sample 25. In Comparative example 1a shown in FIG. 5A, the measurement is performed by inserting the aperture 61 similar to Comparative example 1a shown in FIG. 4A and the aperture is not used in Example 1 shown in FIG. 5B.

As shown in FIG. 5A and FIG. 5B, in both Comparative example 1a and Example 1, the resonance frequency of the TEM00q mode is shifted to the low frequency side by inserting the sample 25 and the resonance of the TEM00q mode is observed at around 298.45 GHz. In Comparative example 1a, as shown in FIG. 5A, the resonance of the TEM04(q–1) mode, which is the higher-order mode, is observed at around 298.3 GHz in a state that the sample 25 is inserted and mounted. In addition, as explained by using FIG. 3, the shift amount of the resonance frequency of the TEM04(q–1) mode to the low frequency side when the sample 25 is mounted is generally smaller than that of the TEM00q mode. Actually, when the polycarbonate having the thickness t of 98 μm is used as the sample 25 similar to the present embodiment, it is found that the resonance frequency of the TEM04(q–1) mode is not shifted almost at all. On the other hand, as shown in FIG. 5B, the resonance is not observed at around the frequency of 298.3 GHZ in Example 1. Namely, in the Fabry-Perot resonator 100 of Example 1, since the opening diameter M (28 mm) of the reflection spherical surfaces is set smaller than a half of the distance D (80 mm) between spherical surfaces, it is considered that the resonance of the TEM04(q–1) mode, which is the higher-order mode, is removed. The resonance of the higher-order mode having the resonance frequency appears at around the resonance frequency of the TEM00q mode used for measuring the dielectric characteristic as shown in comparative example 1a of FIG. 5A, the resonance waveform of the TEM00q mode is distorted. If the resonance waveform of the TEM00q mode is distorted, an error may occur in the 3 dB band width and the Q value (i.e., tan 8) cannot be measured correctly.

When Comparative example 1a without the sample shown in FIG. 4A and Comparative example 1a with the sample shown in FIG. 5A are compared, although the amplitude is reduced by the influence of the dielectric loss of the sample in the resonance of the TEM00q mode used for measuring the dielectric characteristic, the amplitude is not reduced in the resonance of the TEM04(q–1) mode which obstructs the measurement since the TEM04(q–1) mode is hardly affected by the sample. If the resonance of the TEM04(q–1) mode, which is unnecessary higher-order mode, remains without being reduced sufficiently, the amplitude of the resonance of the TEM04(q–1) mode is relatively large with respect to the TEM00q mode. Thus, it can be understood that the influence to the measurement of the dielectric characteristic is large.

FIG. 6A and FIG. 6B are drawings showing the dielectric tangent (tan 8) measured by the Fabry-Perot resonator of Example 1. FIG. 6A shows Comparative example 1a and FIG. 6B shows Example 1. The measured sample 25 is the polycarbonate having the thickness t of 98 μm. In Comparative example 1a shown in FIG. 6A, the measurement is performed by inserting the aperture 61 similar to Comparative example 1a shown in FIG. 4A and the aperture is not used in Example 1 shown in FIG. 6B.

As shown in FIG. 6A and FIG. 6B, the measurement values of tan 8 of Comparative example 1a shown in FIG. 6A vary widely compared to those of Example 1 shown in FIG. 6B. This is because the opening diameter M of the first and second reflection spherical surfaces 13a, 14a is larger than a half of the distance D between spherical surfaces in the Fabry-Perot resonator of Comparative example 1a and thus the resonance of the higher-order mode is not reduced sufficiently, the resonance waveform of the TEM04(q–1) mode, which is the higher-order mode, is superimposed on the resonance waveform of the TEM00q mode used for measuring the dielectric characteristic, and the resonance waveform of the TEM00q mode is distorted.

Embodiment 2

FIG. 7A and FIG. 7B are schematic diagrams showing an opening diameter M, a distance D between spherical surfaces and a curvature radius R in two reflection spherical surfaces of the Fabry-Perot resonator concerning Embodiment 2. FIG. 7A shows Comparative example 2a and FIG. 7B shows Example 2.

The opening diameter M, the distance D between spherical surfaces and the curvature radius R of the reflection spherical surfaces of Comparative example 2a and Example 2 shown in FIG. 7A and FIG. 7B are as follows. In the Fabry-Perot resonator concerning Embodiment 2, the distance D between spherical surfaces is set to 120 mm corresponding to the input signal having the band width (D band: 110 to 170 GHz) of the measurement frequency lower than that of the Fabry-Perot resonator of Embodiment 1.

Opening diameter M of reflection spherical surfaces: 61 mm (Comparative example 2a), 45 mm (Example 2)

Curvature radius R: 96 mm (Comparative example 2a and Example 2)

Distance D between spherical surfaces: 120 mm (Comparative example 2a and Example 2)

Namely, the opening diameter M of the reflection spherical surfaces in Comparative example 2a is larger than a half of the distance D between spherical surfaces and larger than a half of the curvature radius R. On the other hand, the opening diameter M of the reflection spherical surfaces in Example 2 is equal to or less than a half of the distance D between spherical surfaces and equal to or less than a half of the curvature radius R. Note that the explanation of the configurations other than the first spherical reflection mirrors 111a, 111, the second spherical reflection mirrors 112a, 112, the first reflection spherical surfaces 113a, 113 and the second reflection spherical surfaces 114a, 114 of the Fabry-Perot resonator of Comparative example 2a and Example 2 is omitted since the configurations are same as those of the Fabry-Perot resonator 100 of Embodiment 1 (Example 1).

Next, the result of measuring the resonance using the Fabry-Perot resonator having the opening diameter M, the distance D between spherical surfaces and the curvature radius R of Comparative example 2a and Example 2 shown in FIGS. 7A and 7B will be explained. FIG. 8A and FIG. 8B are drawings showing the resonance waveforms measured in a state that the measurement sample is not mounted. FIG. 8A shows Comparative example 2a and FIG. 8B shows Example 2. In Comparative example 2a shown in FIG. 8A, the aperture 61 is inserted between the sample stand 20 and the second reflection spherical surface 114a and the measurement is performed in a state that the diaphragm diameter of the aperture 61 is adjusted so that an unnecessary higher-order resonance of the TEM0nq mode is reduced at the maximum within such a range as not to affect the resonance of the TEM00q mode required for the measurement. In Example 2 shown in FIG. 8B, the aperture is not used.

As shown in FIG. 8A and FIG. 8B, the input signal of 167 GHz is used as the measurement frequency and the resonance of the TEM00q mode used for measuring the dielectric characteristic is observed at around 167 GHz in both Comparative example 2a and Example 2. In addition, in Comparative example 2a, the resonance of the TEM04(q–1) mode, which is the higher-order mode, is observed at around the frequency of 166.6 GHz as shown in FIG. 8A. On the other hand, in Example 2, the resonance is not observed at around the frequency of 166.6 GHz as shown in FIG. 8B. Namely, in the Fabry-Perot resonator of Example 2, since the opening diameter M (45 mm) of the reflection spherical surfaces is set smaller compared to the opening diameter M (61 mm) of Comparative example 2a, it is considered that the resonance of the TEM04(q–1) mode, which is the higher-order mode, is efficiently removed.

Embodiment 3

Next, the relation between the opening diameter M of the reflection spherical surfaces and the measurement frequency (i.e., corresponding wavelength λ) will be explained. In Comparative examples 1a, 2a of Embodiments 1, 2, the measurement result is shown when the measurement is performed in condition that the diaphragm diameter of the aperture 61 is adjusted so that an unnecessary higher-order resonance of the TEM04(q–1) mode is reduced at the maximum within such a range as not to substantially affect the resonance of the TEM00q mode required for measuring the resonance. Embodiment 3 shows the measurement result of the high frequency side and the low frequency side of Examples 1, 2 of Embodiments 1, 2, Comparative examples 1a, 2a (large diaphragm diameter) where the aperture 61 is adjusted so that the resonance of the TEM00q mode is reduced at the maximum within such a range as not to affect the resonance of the TEM04(q–1) mode, and Comparative examples 1b, 2b (small diaphragm diameter) where the aperture 61 is further narrowed compared to Comparative examples 1a, 2a to the extent that the resonance of the TEM04(q–1) mode can be removed. FIG. 9 is a drawing summarizing the above described results of the resonance measurement. FIG. 9 shows the wavelength λ corresponding to the range of the measurement frequency, the ratio M/λ of the opening diameter M of the reflection spherical surfaces with respect to the wavelength λ, whether or not the removal of the resonance of the TEM04(q–1) mode which obstructs the measurement is enough, and whether or not the amplitude and the Q value used for measuring the resonance of the TEM00q mode is enough. In FIG. 9, the mark "o" means that the removal of the resonance of the TEM04(q–1) mode is enough or the amplitude and the Q value of the resonance of the TEM00q mode are enough, while the mark "x" means that the removal of the resonance of the TEM04(q–1) mode is not enough or the amplitude or the Q value of the resonance of the TEM00q mode is not enough.

In the resonance measurement, the amplitude of each resonance mode is relatively large at the high frequency side of the band width of the measurement frequency compared to the low frequency side as described above. As described above, when the sample is mounted, the amplitude is reduced more significantly in the resonance of the TEM00q mode than the TEM04(q–1) mode which obstructs the measurement. Thus, it is required that the amplitude of the resonance of the TEM04(q–1) mode is reduced sufficiently at the high frequency side when the resonance is measured without the sample. As shown in FIG. 9, it was confirmed that the amplitude of the resonance of the TEM04(q–1) mode was reduced sufficiently and the amplitude and the Q value of the resonance of the TEM00q mode were kept large enough when the measurement frequency was 330 GHz (high frequency side) and 220 GHz (the low frequency side) in the Fabry-Perot resonator of Example 1 and when the measurement frequency was 170 GHz (high frequency side) and 110 GHz (low frequency side) in the Fabry-Perot resonator of Example 2.

On the other hand, the resonance of the TEM04(q–1) mode was not reduced enough when the measurement frequency was 330 GHz (high frequency side) in the Fabry-Perot resonator of Comparative example 1a and when the measurement frequency was 170 GHz (high frequency side) in the Fabry-Perot resonator of Comparative example 2a. In Comparative example 1b where the diaphragm diameter of the aperture 61 was narrowed so that the resonance of the TEM04(q–1) mode is reduced sufficiently at 330 GHz (high frequency side) and Comparative example 2b where the diaphragm diameter of the aperture 61 was narrowed so that the resonance of the TEM04(q–1) mode was reduced sufficiently at 170 GHz (high frequency side), although the resonance of the TEM04(q–1) mode was reduced sufficiently, the amplitude or the Q value of the resonance of the TEM00q mode was not sufficient. Namely, it was realized from each of Comparative examples that it was difficult to achieve sufficient reduction of the resonance of the TEM04 (q–1) mode while remaining sufficient amplitude and sufficient Q value of the resonance of the TEM00q mode in the whole band width of the measurement frequency even if the diaphragm diameter of the aperture 61 was adjusted.

In addition, the amplitude and the Q value of the resonance of each resonance mode are relatively small at the low frequency side of the band width of the measurement frequency as described above. If the amplitude and the Q value of the resonance of the TEM00q mode used for measuring the dielectric characteristic are too small, the measurement of the resonance characteristic becomes difficult. In particular, when the dielectric loss of the sample is large, the amplitude and the Q value of the resonance of the TEM00q mode become too small. Thus, it is difficult to distinguish the resonance from the noise and it becomes difficult to obtain the correct result of the resonance measurement as a tendency. In the resonance measurement using the polycarbonate (PC) having the thickness t of 98 μm as the sample of having relatively large dielectric loss, the amplitude and the Q value of the resonance of the TEM00q mode itself didn't become too small and the amplitude and the Q value required for the resonance measurement could be obtained even at the measurement frequency of 220 GHz which was the low frequency side in the Fabry-Perot resonator of Example 1 and even at the measurement frequency of 110 GHz which was the low frequency side in the Fabry-Perot resonator of Example 2. In addition, when the opening diameter M of the reflection spherical surfaces was further reduced in the Fabry-Perot resonator of Example 1 and Example 2, the characteristics of the resonance of the TEM00q mode were deteriorated particularly in the low frequency side as a tendency. From the above described result, in order to measure the resonance correctly, it is required to set the opening diameter M of the reflection spherical surfaces 15 (fifteen) times or more of the wavelength of the measurement frequency in the measurement frequency of 100 GHz or more and 20 (twenty) times or more of the wavelength of the measurement frequency in the measurement frequency of 220 GHz or more.

Effect and the Like

As described above, the Fabry-Perot resonator of Examples 1, 2 includes the first spherical reflection mirrors 11, 111 having the first reflection spherical surfaces 13, 113 and the second spherical reflection mirrors 12, 112 having the second reflection spherical surfaces 14, 114 wherein the second reflection spherical surfaces 14, 114 are arranged to face the first reflection spherical surfaces 13, 113. The opening diameter M of the first reflection spherical surfaces 13, 113 and the second reflection spherical surfaces 14, 114 is equal to or less than a half of the distance D between spherical surfaces between the first reflection spherical surfaces 13, 113 and the second reflection spherical surfaces 14, 114.

Consequently, the Fabry-Perot resonator can measure the dielectric characteristic of the sample more precisely by removing the resonance of unnecessary higher-order mode without substantially affecting the resonance of the TEM00q mode used for the measurement.

In addition, the opening diameter M of the first reflection spherical surfaces 13, 113 and the second reflection spherical surfaces 14, 114 is equal to or less than a half of the curvature radius R of the first reflection spherical surfaces 13, 113 and the second reflection spherical surfaces 14, 114 in the Fabry-Perot resonator of Examples 1, 2. Consequently, the Fabry-Perot resonator can reduce the resonance of unnecessary higher-order mode more sufficiently.

In addition, it is desirable that the opening diameter of the reflection spherical surfaces is set 15 (fifteen) times or more of the wavelength of the measurement frequency. Consequently, the Fabry-Perot resonator can perform the measurement with the amplitude and the Q value sufficient for the resonance of the TEM00q mode used for the measurement.

In addition, the diameter of the through hole 24 of the sample stand 20 is smaller than the opening diameter M of the first reflection spherical surfaces 13, 113 and the second reflection spherical surfaces 14, 114 in the Fabry-Perot resonator of Embodiments 1, 2. Consequently, the Fabry-Perot resonator can reduce the resonance of unnecessary higher-order mode sufficiently.

Other Embodiments

In Embodiments 1 to 3, the Fabry-Perot resonator having the same opening diameters M between the first reflection spherical surfaces 13, 113 and the second reflection spherical surfaces 14, 114 is explained. Since the resonance characteristic to be measured depends on the smaller opening diameter, when at least one of the opening diameters M of the first reflection spherical surface and the second reflection spherical surface is equal to or less than a half of the distance D between spherical surfaces, the resonance of unnecessary higher-order mode can be reduced sufficiently similar to Embodiments 1 to 3 when measuring the dielectric characteristic. For example, the resonance of unnecessary higher-order mode can be reduced sufficiently in the Fabry-Perot resonator using the first spherical reflection mirror 11a (opening diameter M of first reflection spherical surface 13a: 50 mm) of Comparative example 1a and Embodiment 1 and the second spherical reflection mirror 12 (opening diameter M of second reflection spherical surface 14: 28 mm) of Example 1.

In the Fabry-Perot resonator explained in Embodiments 1 to 3, the whole of the first reflection spherical surfaces 13, 113 and the second reflection spherical surfaces 14, 114 are exposed to a space between the first reflection spherical surface and the second reflection spherical surface and the diameter of the reflection spherical surfaces is same as the opening diameter M of the reflection spherical surfaces. It is also possible that a limiter (e.g., a plate formed of aluminum or resin) with a circular aperture having a smaller diameter than that of the reflection spherical surfaces is mounted on the reflection spherical surfaces so that the center of the reflection spherical surfaces and the center of the circular aperture are positioned on the same axis to substantially reduce the opening diameter M of the reflection spherical surfaces instead of reducing the diameter of the reflection spherical surface itself. Also in this case, similar to Embodiments 1 to 3, the resonance of unnecessary higher-order mode can be reduced sufficiently for the measurement of the dielectric characteristic when the diameter (opening diameter M) of the opening surface of the reflection spherical surfaces contributing to the measurement of the resonance characteristic is equal to or less than a half of the distance D between spherical surfaces. For example, in the Fabry-Perot resonator of Comparative example 1a of Embodiment 1, when the limiter having a circular aperture (diameter: 28 mm) is mounted on the first spherical reflection mirror 11a (opening diameter M of first reflection spherical surface 13a: 50 mm), the opening diameter M of the first reflection spherical surface 13a is substantially 28 mm. Thus, the resonance of unnecessary higher-order mode can be reduced sufficiently.

In the examples explained in the Fabry-Perot resonator of Embodiments 1 to 3, the diameter of the through hole 24 of the sample stand 20 is smaller than the opening diameter M in the first reflection spherical surfaces 13, 113 and the second reflection spherical surfaces 14, 114. The resonance of unnecessary higher-order mode can be reduced sufficiently for the measurement of the dielectric characteristic when the opening diameter M is equal to or less than a half of the distance D between spherical surfaces. Thus, it is possible to set the diameter of the through hole 24 larger than the opening diameter M. However, the resonance of the higher-order mode can be reduced more when the diameter of the through hole 24 is set smaller than the opening diameter M.

In the Fabry-Perot resonator of Embodiments 1 to 3, the first waveguide 41 and the second waveguide 42 are used respectively for the signal injection portion and the signal detection portion. It is also possible to use a coaxial cable having a loop antenna at an end portion instead of the first waveguide 41 and the second waveguide 42 depending on the measurement frequency.

INDUSTRIAL APPLICABILITY

The open resonator of the present invention is suitable for measuring the dielectric characteristic of the sample precisely in the frequency range exceeding 100 GHz by remov-
ing the resonance of unnecessary higher-order mode.

DESCRIPTION OF THE REFERENCE
NUMERALS

10: fixing stand
11, 11a, 111, 111a: first spherical reflection mirror
12, 12a, 112, 112a: second spherical reflection mirror
13, 13a, 113, 113a: first reflection spherical surface
14, 14a, 114, 114a: second reflection spherical surface
15: first coupling hole
16: second coupling hole
20: sample stand
24: through hole
25: sample
35: position adjustment mechanism
36: base
37: micrometer
41: first waveguide
42: second waveguide
50: cover
60: spherical reflection mirror
61: aperture
100: Fabry-Perot resonator
D: distance between spherical surfaces
M: opening diameter
R: curvature radius
λ: wavelength

16

The invention claimed is:
1. An open resonator configured to measure a dielectric property of a dielectric at a measurement frequency of 100 GHz or higher, the open resonator comprising:
    a first spherical reflection mirror having a first reflection spherical surface; and
    a second spherical reflection mirror having a second reflection spherical surface arranged to face the first reflection spherical surface, wherein
    at least one of a diameter of the first reflection spherical surface and a diameter of the second reflection spherical surface is equal to or less than a half of a distance between the first reflection spherical surface and the second reflection spherical surface, and is equal to or less than a half of a curvature radius of the first reflection spherical surface and the second reflection spherical surface.
2. The open resonator according to claim 1, wherein
    at least one of the diameter of the first reflection spherical surface and the diameter of the second reflection spherical surface is equal to or more than fifteen times of a wavelength of a measurement frequency.
3. The open resonator according to claim 1 further comprising:
    a sample stand arranged between the first reflection spherical surface and the second reflection spherical surface, the sample stand having a through hole for exposing a sample, wherein
    a diameter of the through hole is smaller than at least one of the diameter of the first reflection spherical surface and the diameter of the second reflection spherical surface.

* * * * *